United States Patent [19]
Rahman et al.

[11] Patent Number: 5,627,355
[45] Date of Patent: *May 6, 1997

[54] TRANSACTION DEVICE, EQUIPMENT AND METHOD FOR PROTECTING ACCOUNT NUMBERS AND THEIR ASSOCIATED PERSONAL IDENTIFICATION NUMBERS

[76] Inventors: Sam Rahman, 4809 Laurette St., Torrance, Calif. 90503; James Magner, 5092 Tripoli Ave., Los Alamitos, Calif. 90720; John Brown, 12831 Longden St., Garden Grove, Calif. 92645; Adarsh Pun, 5404 White Fox Dr., Rancho Palos Verdes, Calif. 90274; Grant Parker, 3996 Myra Ave., Los Alamitos, Calif. 90720

[*] Notice: The term of this patent shall not extend beyond the expiration date of Pat. No. 5,478,994.

[21] Appl. No.: 422,708

[22] Filed: Apr. 13, 1995

Related U.S. Application Data

[63] Continuation-in-part of Ser. No. 274,252, Jul. 13, 1994, Pat. No. 5,478,994.

[51] Int. Cl.$^6$ ........................................... G06K 5/00
[52] U.S. Cl. ........................... 235/380; 235/379; 380/23
[58] Field of Search ................................ 235/380, 379; 380/23, 24, 25, 46

[56] References Cited

U.S. PATENT DOCUMENTS

| | | | |
|---|---|---|---|
| 4,295,039 | 10/1981 | Stuckert | 235/380 |
| 4,628,195 | 12/1986 | Baus | 235/440 |
| 4,630,201 | 12/1986 | White | 235/380 X |
| 4,694,412 | 9/1987 | Domenik et al. | 364/717 |
| 4,772,782 | 9/1988 | Nonat | 235/380 |
| 4,786,790 | 11/1988 | Kruse et al. | 235/380 |
| 5,068,894 | 11/1991 | Hoppe | 380/23 |
| 5,177,790 | 1/1993 | Hazard | 380/28 |
| 5,180,902 | 1/1993 | Schick et al. | 235/380 |
| 5,208,447 | 5/1993 | Kruse | 235/380 |
| 5,259,649 | 11/1993 | Shomron | 283/114 |
| 5,367,572 | 11/1994 | Weiss | 380/23 |

*Primary Examiner*—Donald T. Hajec
*Assistant Examiner*—Michael G. Lee
*Attorney, Agent, or Firm*—John J. Connors; Connors & Assoc.

[57] ABSTRACT

Security equipment protects the relaying of account numbers and personal identification numbers (PIN) by telephonic or other communication link. The equipment includes a host computer an a remote portable transaction device that interact. A credit granting institution generates an account number and a series of unique personal identification numbers for each account number. This information is stored in the host computer's memory and is assigned as a reference series to an individual customer account number. An identical series of numbers in the same sequence is stored in the memory of the remote device. In operation, the customer account on the host computer is activated and the host computer's memory is indexed sequentially to the first number in the reference series. During the use of the remote device, a unique personal identification number is added to the customer account number and transmitted to the host computer. There it is compared to the account number and personal identification number in the reference series. The computer will authorize the transaction if the number in the stored series is identical the number in the reference series. Otherwise the transaction will be denied or questioned.

19 Claims, 7 Drawing Sheets

Host Computer Flow Diagram (Continued)

* Note: The number the system searches forward and backward is dictated by the individual company.

Host Computer Flow Diagram (Continued)

Figure 6

| Should Enter | 2356 |
| Entered | 2376 |

Customer Card ⚡ Host Computer

| Customer # | PIN # | | Seq # | Status | PIN # |
|---|---|---|---|---|---|
| ~~0001~~ | ~~1765~~ | | ~~0001~~ | Used | ~~1765~~ |
| ~~0002~~ | ~~0669~~ | | ~~0002~~ | Used | ~~0669~~ |
| ~~0003~~ | ~~8213~~ | | ~~0003~~ | Used | ~~8213~~ |
| ~~0004~~ | ~~1982~~ | | ~~0004~~ | Used | ~~1982~~ |
| ~~0005~~ | ~~1443~~ | | ~~0005~~ | Used | ~~1443~~ |
| ~~0006~~ | ~~1322~~ | | ~~0006~~ | Used | ~~1322~~ |
| ~~0007~~ | ~~2346~~ | | ~~0007~~ | Used | ~~2346~~ |
| →0008 | 2356 | | →0008 | | 2356 |
| 0009 | 2376 | | 0009 | | 2376 |
| 0010 | 9227 | | 0010 | | 9227 |

TRANSACTION DEVICE, EQUIPMENT AND METHOD FOR PROTECTING ACCOUNT NUMBERS AND THEIR ASSOCIATED PERSONAL IDENTIFICATION NUMBERS

RELATED PATENT APPLICATIONS

This application is a continuation-in-part application of U.S. Ser. No. 08/274,252, entitled "Secure Credit Card & Method," filed Jul. 13, 1994 now U.S. Pat. No. 5,478,994. This related application is incorporated herein by reference and made a part of this application.

BACKGROUND OF THE INVENTION

1. Field of the Invention

This invention relates to remote, portable credit transaction devices and their method of use and associated equipment and apparatus that prevents unauthorized charges against an account number.

2. Background Discussion

Charge accounts are used to make purchases of goods and services and to conduct other credit transactions. Typically, a customer identification code or account number consists of thirteen to nineteen digits. As used herein, the identification customer code and account number are considered equivalent terms, and hereafter only account number is used. Account numbers are displayed on credit cards identifying a customer.

In some instances when credit cards are used, they interact with a credit transaction device. The account number is used to identify the customer and charge purchases against. In addition to the account number, a personal identification number (PIN) is also frequently used to identify the customer. For example, when using automatic teller machines, the customer first inserts an ATM credit card and then keys into the automatic teller machine a personal identification number (PIN) which is needed to authorize the transaction. Even though personal identification numbers reduce unauthorized use of the card, it is still possible for an unauthorized person to obtain access to this number and and the account number and use the card fraudulently.

Because thievery of credit information has reached alarming conditions in the credit industry, there is an industry wide demand for an expedient solution. With the use of computers to conduct credit transactions through the Internet, World Wide WEB, and the use of radio (cellular) telephones which are easily tapped into to steal credit information, security measures must be adopted. But these measures should be inexpensive, simple to implement, and be readily accepted and convenient for the customer.

SUMMARY OF THE INVENTION

It is the objective of this invention to provide a simple and expedient way to prevent unauthorized credit transactions by generating with each transaction a unique personal identification number (PIN) that is associated with the account number being charged.

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include preventing unauthorized use of a credit card or other portable transaction device, convenience of use, and simplicity of manufacture of the credit card using conventional electronic chip components.

The first feature of this invention is apparatus for making credit transactions including a remote, portable transaction device and a host computer. The portable transaction device and computer are adapted to be placed in communication with each other when a credit transaction is to be authorized. The transaction device, for example, may be in the form of a credit card, a telephone with an installed memory chip, or a computer disk.

The second feature is that the host computer has a memory in which is stored a plurality of individual account numbers which are authorized to conduct credit transactions. Each account number has associated with it a reference series of unique personal identification numbers. The numbers in these reference series are in a predetermined sequence. Only one individual number is used with each credit transaction conducted. The one individual number used is from a selected reference series that corresponds to an individual account number against which the credit transaction is charged.

The third feature is that the transaction device has a memory element in which is stored a series of unique numbers in a predetermined sequence. These unique numbers are identical to numbers stored in the memory of the host control computer and are in the identical sequence as the numbers in the host computer. The memory element of the transaction device provides the next unique number in sequence with each use of the transaction device. This permits verification by comparing the account number and the number provided with each use of the transaction device with the account number and the next number in sequence as indicated by the host computer. The host computer confirms that the transaction is authorized by comparing the account number and the next in sequence personal identification number provided by the transaction device with the account number and the next number in sequence in the selected reference series of numbers as indicated by the host computer. The transaction is authorized when both the account number and the personal identification number are identical.

The fourth feature is that this invention includes a novel secure credit card. This credit card includes a body member having a memory element in which is stored a series of unique numbers in a predetermined sequence. The unique numbers are identical to numbers stored in a memory of a host control computer and are in the identical sequence as the numbers in the host computer. The host computer is accessible upon each use of the credit card. The memory element provides the next number in sequence with each use of the credit card thereby, upon each use of the credit card, verifying the card by comparing the account number and the number provided by the memory element with the account number and the next number in sequence as indicated by the host computer. A switch is actuated by the customer with each use of the credit card to activate the memory element to provide the next number in the sequence, and a counter counts each use of the credit card. There are two display devices in the body member. One display device displays the next number in the sequence with each use of the credit card. The other display device displays the total number of times the counter has been indexed. One display device may be used if a toggle device is employed.

The credit card has essentially the same appearance as conventional credit cards and is about the same width, length, and thickness. The body member usually is made of a thin sheet material such as, for example, plastic, graphite epoxy, aluminum, or other metals, and the electronic components of the card are attached to or housed within this body member. For example, the credit card includes a microprocessor controller electrically coupled to an electronically programmable read only memory (EPROM) device, both of which are very small electronic chip circuits embedded in the thin sheet material body member. Upon actuation, a pulse signal is forwarded to the microprocessor controller to activate the microprocessor controller to turn on the EPROM device which provides the next unique number in sequence and indexes the counter.

The fifth feature of this invention is equipment for verifying credit transactions which includes a host computer having a memory element in which is stored a plurality of individual account numbers which are authorized to conduct credit transactions. Each account number has associated with it a reference series of unique personal identification numbers in a predetermined sequence. Only one individual number is used with each credit transaction conducted, and this one individual number is from a selected references series that corresponds to the individual account number against which the credit transaction is charged. There are a plurality of remote, portable devices, each one of these remote devices is dedicated for use with only one individual account number. Each one of these remote devices includes a memory element having stored therein a stored series of personal identification numbers identical in number and sequence to the selected reference series. Each remote device with each use is operable to provide the next number in sequence in the stored series of numbers to permit comparison with the next personal identification number in the selected reference series. A communication link such as, for example, a telephone line establishes communication with the host computer with each individual credit transaction. The communication link transmits to the host computer the account number and the next in sequence individual personal identification number in the stored series for the remote device used to conduct the credit transaction. The host computer confirms that the transaction is authorized by comparing the account number and the next in sequence personal identification number provided by the remote device with the account number and the next number in sequence in the selected reference series of numbers as indicated by the host computer. The transaction is authorized when both the account number and the personal identification number are identical.

This invention also includes a method of verifying that a credit transaction is authorized. The method includes (a) providing a host computer having a memory element in which is stored a plurality of individual account numbers which are authorized to conduct credit transactions, each account number having associated therewith a reference series of unique personal identification numbers, the numbers in said reference series being in a predetermined sequence, and only one individual number being used with each credit transaction conducted, said one individual number being from a selected references series that corresponds to the individual account number against which the credit transaction is charged, (b) providing a plurality of remote, portable devices, each one of said remote devices dedicated for use with only one individual account number, each one of said remote devices including a memory element having stored therein a stored series of personal identification numbers identical in number and sequence to the selected reference series, each remote device with each use being operable to provide the next number in sequence in said stored series of numbers to permit comparison with the next personal identification number in said selected reference series, (c) using a remote device to conduct a credit transaction and transmitting to the host computer the number in the stored series provided by said remote device, and (d) comparing said number provided in step (c) with the next number in sequence in the reference series as indicated by the host computer.

If the number generated with the use of the remote device does not match the next number in sequence as indicated by the host computer, the transaction is unauthorized.

DESCRIPTION OF THE DRAWING

The preferred embodiment of this invention, illustrating all its features, will now be discussed in detail. This embodiment depicts the novel and non-obvious credit card, equipment and method of this invention as shown in the accompanying drawing, which is for illustrative purposes only. This drawing includes the following figures, with like numerals indicating like parts:

FIG. 6 is a schematic diagram illustrating the erroneous usage of the secure credit card.

DETAILED DESCRIPTION OF THE PREFERRED EMBODIMENT

Figure 2:
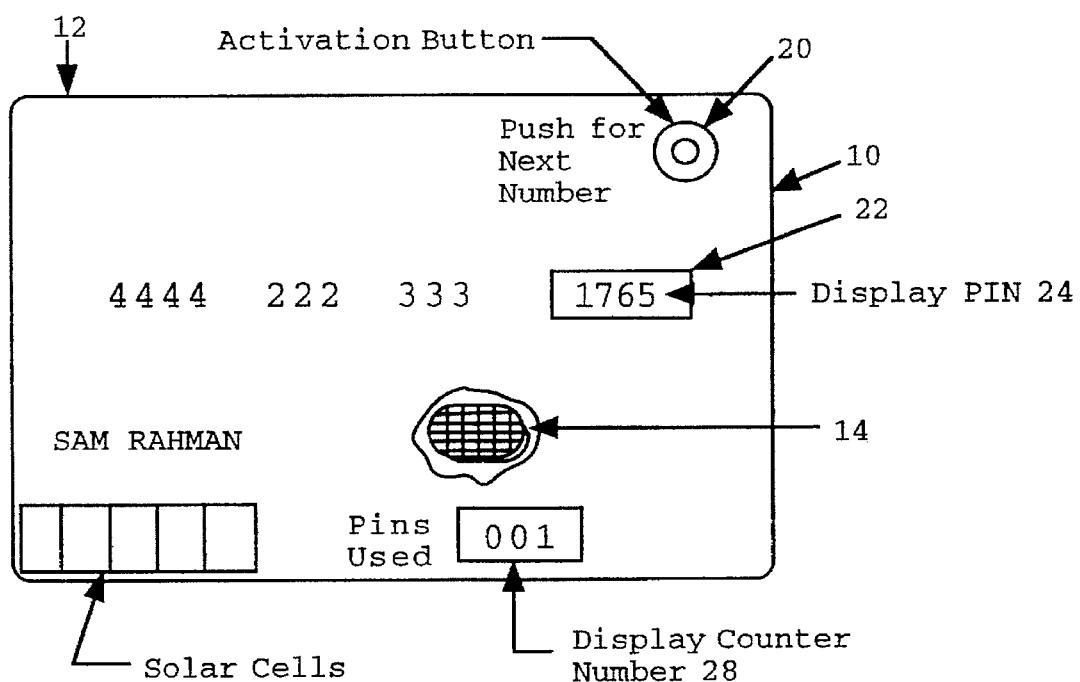
FIG. 2 is a plan view showing the front face of the secure credit card of this invention.
Figure 2A:
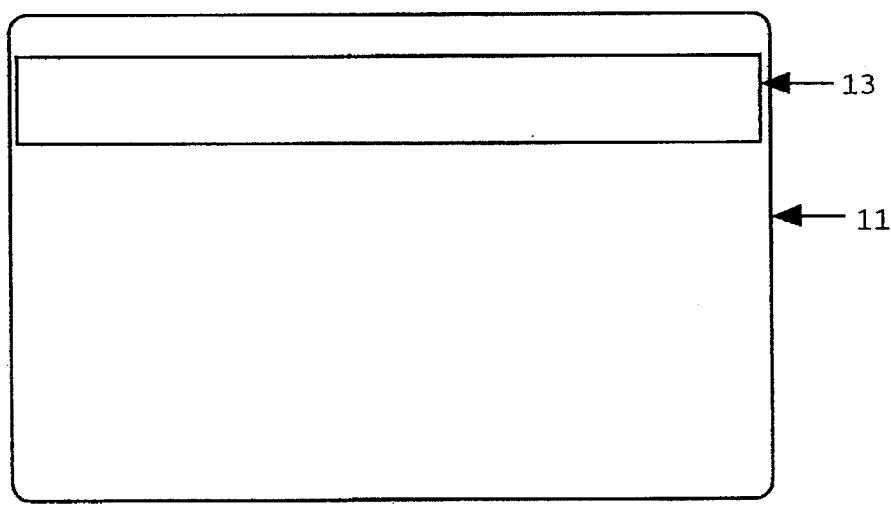
FIG. 2A is a plan view showing the back of the secure credit card of this invention.

The secure credit card 10 of this invention depicted in FIGS. 2 and 2A is typical in some respects to conventional credit cards. It has a thin sheet material body 12 with a approximate length, width, and thickness of a standard credit card. There can be up to a nineteen digit account number on the face of the card 10 identifying the customer. In this case 4444 222 333. As shown in FIG. 2A, the back 11 of the card 10 has a conventional magnetic strip 13 encoded with the same account number appearing on the face of the card, i.e., 4444 222 333. Optionally, customer information such as name, address, phone number may be displayed on the card 10.

Figure 3:
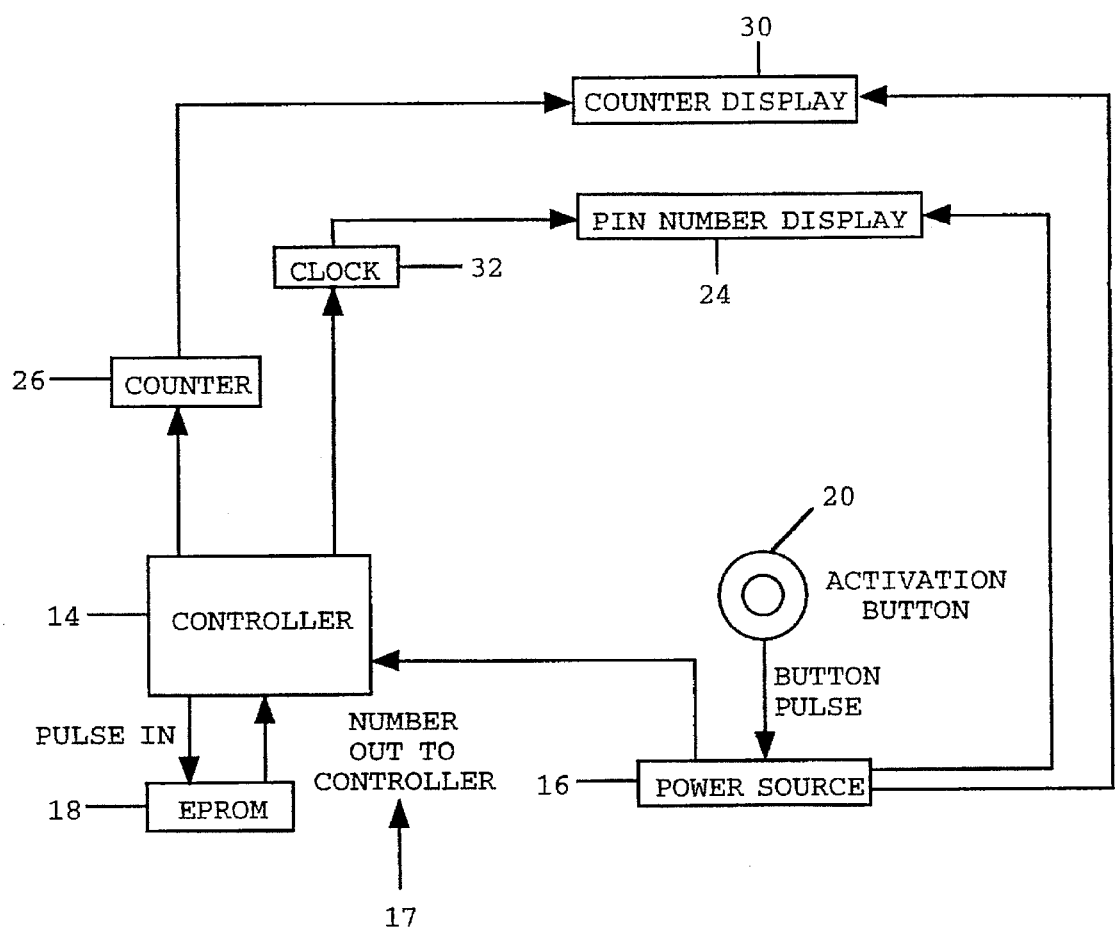
FIG. 3 is a schematic wiring diagram showing the principal electronic components contained within or attached to the secure credit card shown in FIG. 2.

Unlike conventional credit cards, the card 10 has the circuit 17 shown in FIG. 3 encased within the card. Imbedded within the card 10 is a microprocessor controller 14, a power source 16, for example a solar battery, and an electronic programmable read only memory (EPROM) device 18 storing a unique series of numbers. There is a push button switch 20 in the upper right hand corner of the card 10, which when depressed creates a pulsed electrical signal that activates the microprocessor controller 14. When the switch 20 is activated, the microprocessor controller 14 accesses the EPROM device 18, and the next unique personal identification number (PIN) is displayed in a window 22 in the card 10. Within the window 22 is a liquid crystal or Mylar display device 24 which displays, for example, a the unique personal identification number of four digits. In this case 1765. Activating the push button switch 20 generates an electrical pulse which is forwarded to the microprocessor controller 14. The controller 14 then activates the EPROM device 18 which displays the personal identification number 1765 in the window 22 on display device 24.

There is a counter 26 connected to the microprocessor controller 14 which counts each time the card is used and a counter display window 28 which shows a count of the total number of unique personal identification numbers used. This number displayed in the counter display window 28 corresponds to a counter number. The EPROM device 18 of each individual card 10 is programmed with a series of unique numbers in a known predetermined sequence. This series of unique numbers is stored in the memory of the EPROM device 18. A host computer (not shown) also has stored in its memory the same a series of numbers in the same predetermined sequence as the series of numbers in the EPROM device 18. For purposes of clarity the numbers stored in the card 10 (or other portable transaction device) shall be referred to as the stored series of numbers and the numbers in the computer shall be referred to as the reference series of numbers, although both are identical in number and identical in sequence. The host computer may be any conventional general purpose computer programmed to interact with millions of different cards 10, or any other portable transaction device useable with an individual account and having stored in its memory a series of personal identification numbers which are accessed sequentially.

The host computer is accessed each time the card 10 is used, and account number, the unique personal identification numbers, and the counter numbers in the both the host computer and credit card are compared with each credit transaction. Specifically, the four digit personal identification number 1765, in combination with the account number 4444 222 333, is transmitted to the host computer by telephone lines. As is discussed in greater detail subsequently, the host computer verifies that the account number is active and searches for the unique personal identification number 1765 to authorize the transaction. The transaction is a valid, authorized transaction, provided the account number and personal identification number 1765 matches the account number and personal identification number in the host computer's memory.

A conventional clock or timer 32 is activated for a predetermined time period, for example, 30 to 60 seconds each time the card is used. When this time period has elapsed, the timer 32 is automatically turned off and the personal identification number in the window 22 is cleared and the counter display window 28 is cleared. The counter number corresponds to the total number of transactions conducted. As indicated, the window 22 shows that the personal identification number 1765 was the first transaction, that is, the counter number is 001. The counter number is important since in some instances human intervention is required as discussed in greater detail subsequently.

The personal identification number, in this case 1765, is then transmitted to the host computer which keeps track of the sequence of personal identification numbers used. This information can be forwarded to the host computer in any conventional manner such as a telephone call, or forwarding the information via a modem, or over conventional retail transaction devices. If the account number, for example, 4444 222 333, and personal identification number, for example, 1765, does not match the account number and the next personal identification number in sequence in the host computer, the transaction will not be authorized unless human intervention overrides the decision of the host computer.

Figure 1A:
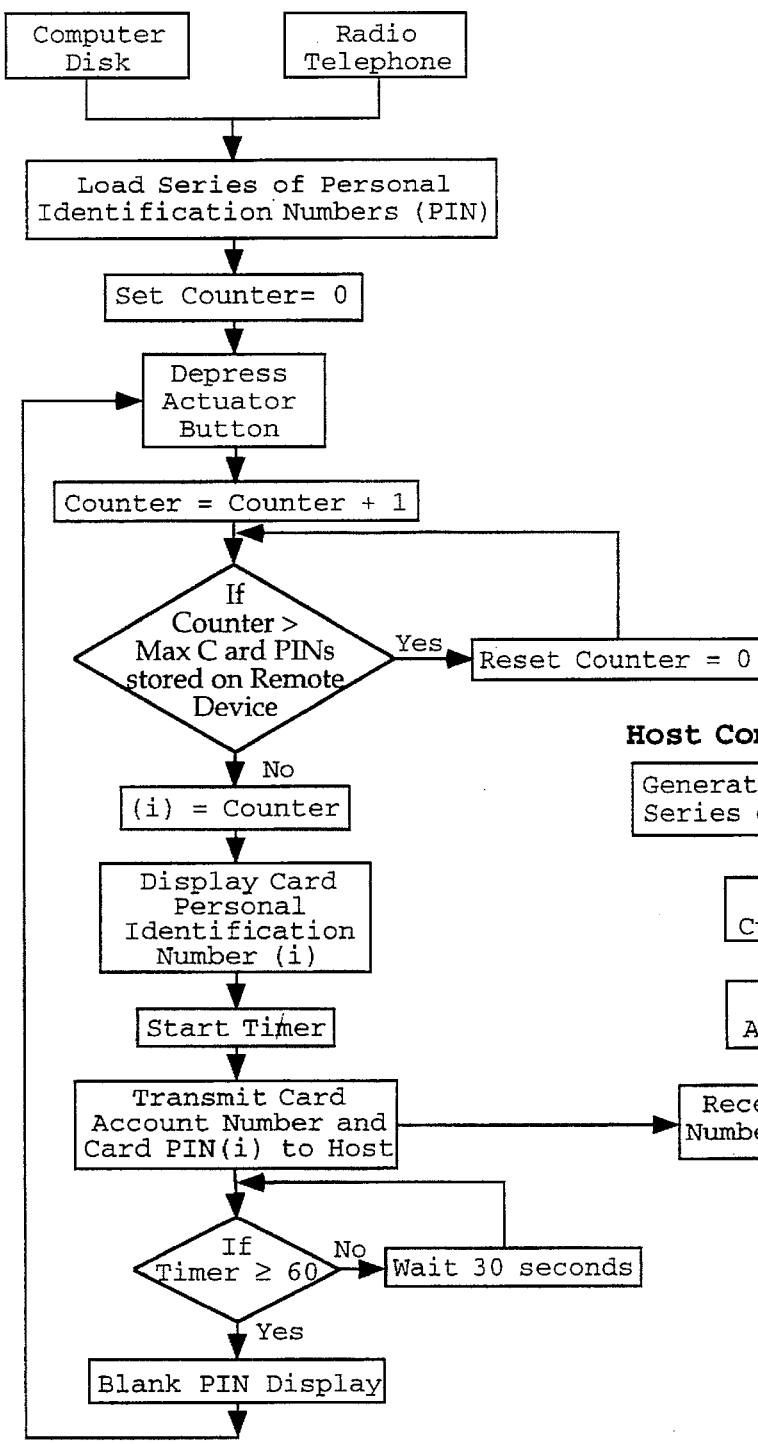
FIG. 1 is a flow diagram illustrating the manner in which the portable interacts with the host computer in conducting a credit transaction.
Figure 1B:
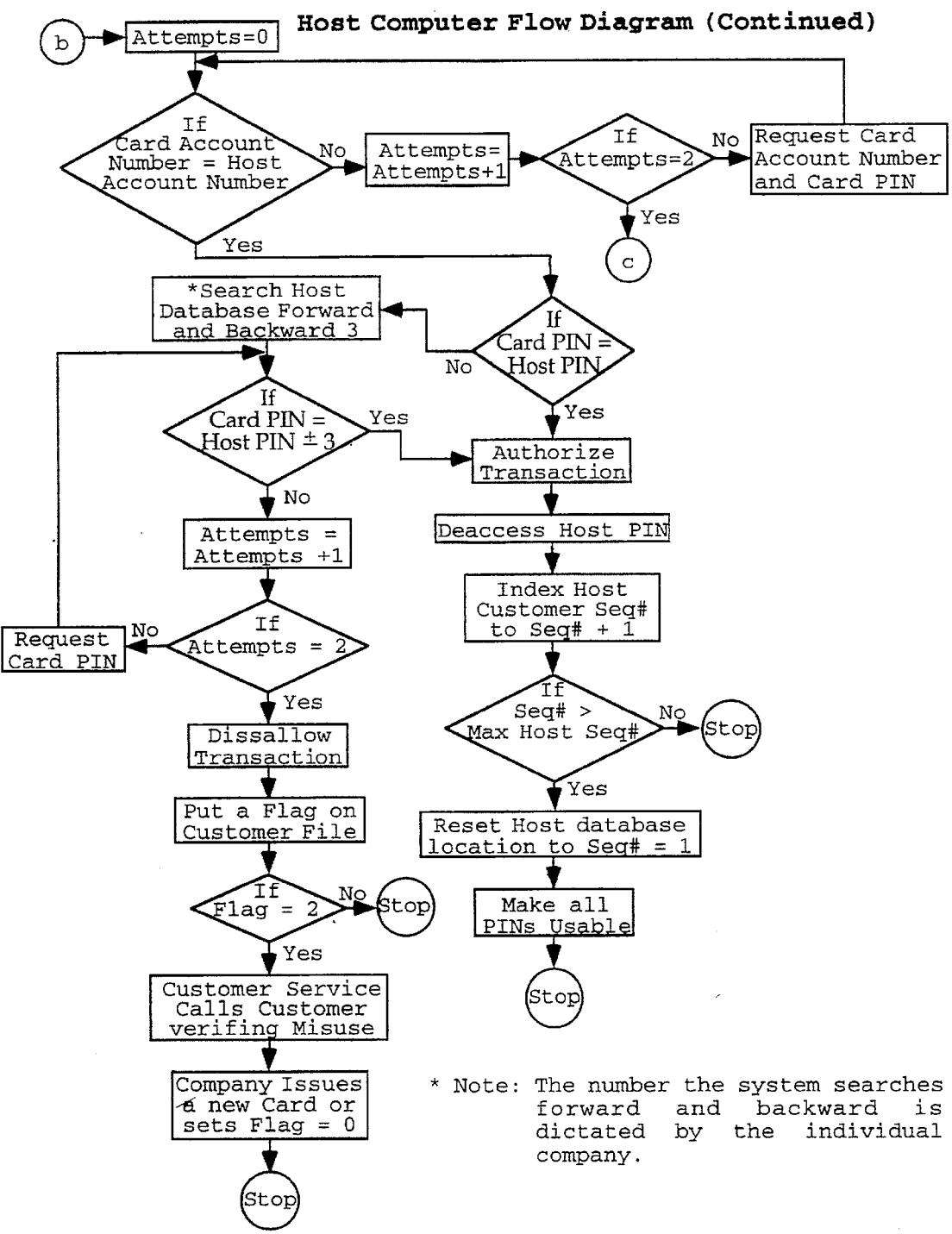
Figure 1C:
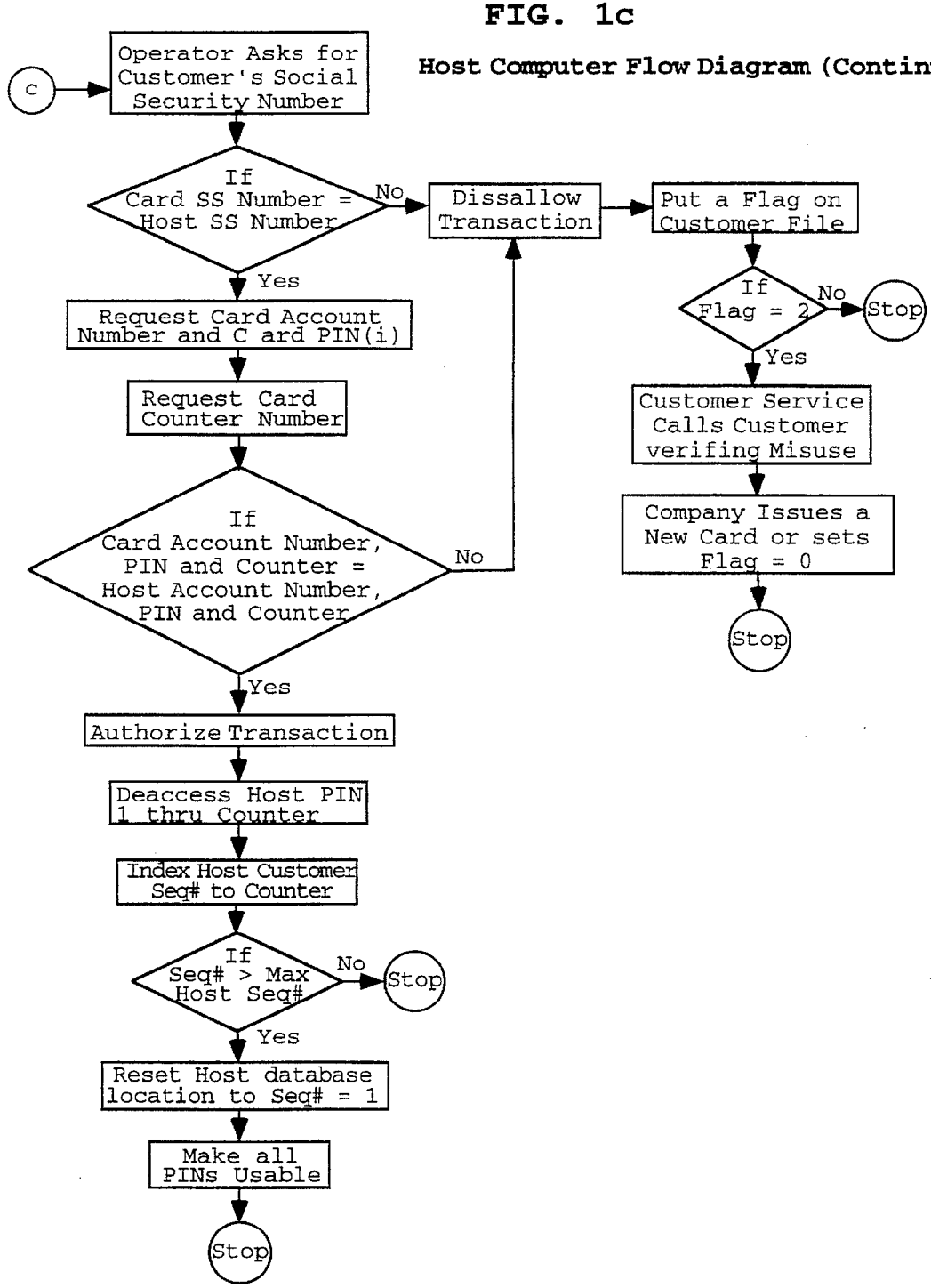

FIG. 1 depicts the use of a remote portable device with a host computer to conduct credit transactions in accordance with this invention. The remote, portable device may be, for example, the secure credit card 10, a radio telephone, or a computer disk. In the case of a radio telephone or a computer disk, each will have a memory element in which is stored a unique series of personal identification numbers that correspond with a series of numbers stored in the memory element of the host computer for the selected account against which the credit transaction is charged. For the purposes of the following discussion, the portable device shall be the card 10, but a conventional radio telephone or a computer disk may be modified to interact with the host computer in a similar manner as the card 10.

A fulfillment house selected by the credit institution granting credit first loads the card 10 with the account number and a series of unique personal identification numbers and sets the counter 26 at zero. After the customer has received the credit card 10 and the customer is verified, the card may be used. When a credit transaction is conducted, the customer depresses the actuating button switch 20. If the counter indicates that the total number of unique personal identification numbers has been exceeded, the counter is reset to zero and the controller 14 reindexes the EPROM to the first personal identification number. If this is not the case, the counter 26 advances one digit, in this example to 0001. At the same time the unique personal identification number 1765 for this transaction is displayed in the window 22. The timer or clock 32 is started.

If, for example, a credit card telephone call is being made, the customer calls the telephone company access number and enters the phone number he or she intends to call. When the customer hears the dial tone, the account number 4444 222 333 and the personal identification number 1765 are both entered using the telephone keypad. These numbers are then both transmitted over the telephone line to the host computer. When the clock run out, it is reset to zero, and the window 22 is cleared of numbers.

Figure 4:
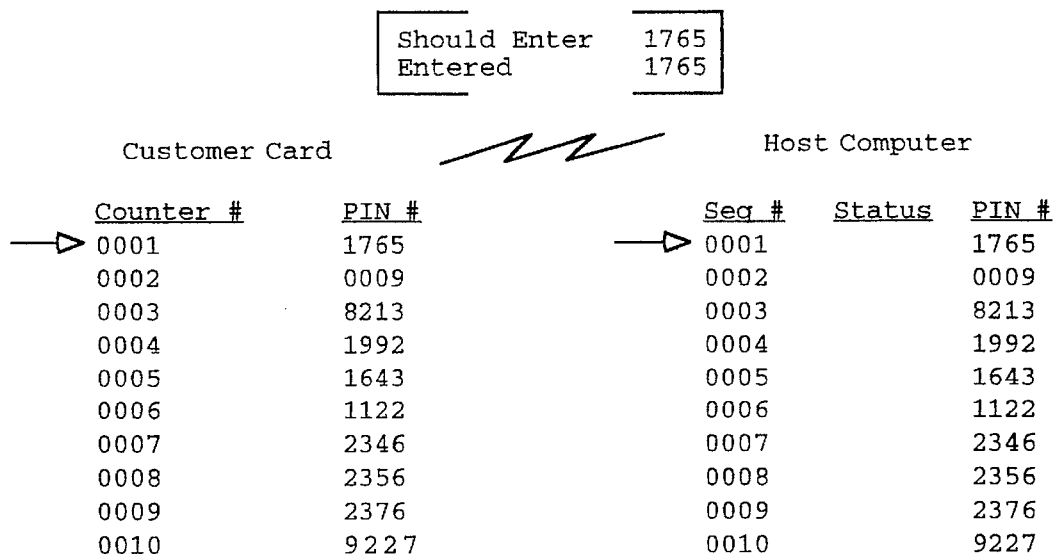
FIG. 4 is a schematic diagram illustrating the initial usage of the secure credit card.

In the host computer there is stored in the computer's memory all the account numbers authorized to conduct credit transactions and associated with each account number a series of reference personal identification numbers. Also stored in the computer's memory are the customer Social Security Numbers for each account number. Each reference series is identical in both number and sequence to the stored numbers in the EPROM device 18 of the credit card 10. As depicted in FIG. 4, the host computer scans through its reference series of personal identification numbers for the account to be charged, correlating the counter numbers and personal identification numbers to confirm a match. If no match is found, then the transaction will not be authorized. The host computer deactivates the personal identification number 1765 after the transaction and advances to the counter number 0002 with the associated personal identification number 0009 being the next number in the reference series. Note, the next counter number 0002 in the stored series in the EPROM 18 has associated with it the personal identification number 0009. This number 0009 will appear in the window 22 with the next transaction.

Figure 5:
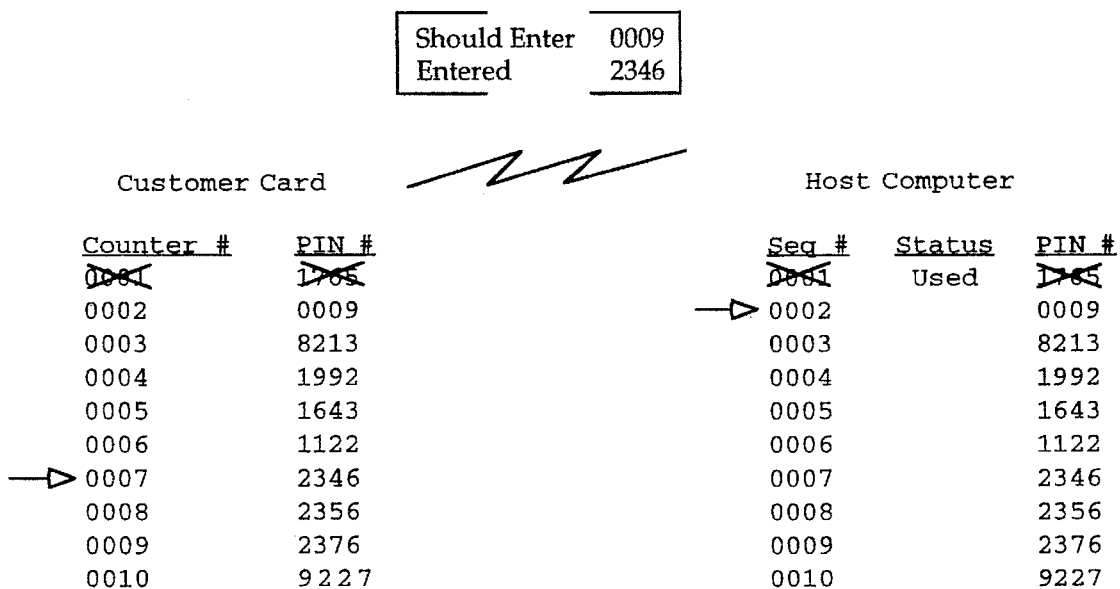
FIG. 5 is a schematic diagram illustrating the inadvertent usage of the secure credit card.

As illustrated in FIG. 5, the actuating button switch 20 may be accidently activated, for example, the customer's child pushes the button switch five times, advancing the sequence number from 0002 to 0006. The customer unaware of this pushes the actuating button switch 20 and seeing the personal identification number 2346 displayed in the window 22 enters this number in the keypad of the telephone. But the next personal identification number 0009 stored in the memory of the computer does not match the personal identification number 2346, and the transaction cannot be authorized.

The host computer is programmed to conduct a search backward and forward three numbers. If the correct number is found in this search, the transaction is authorized and the intervening numbers are deactivated. If no matching number is found in this search, the host computer requests the customer to reenter the account number and the personal identification number and searches again to determine whether the card 10 is being used fraudulently. If the search fails to locate the correct personal identification number the second time, a live operator intervenes, asking for customer identification such as the customer's Social Security Number. If the Social Security Number does not match the actual Social Security Number stored in the host computer of the customer, the transaction is denied and a flag is placed in the customer account. If another incorrect Social Security Number is given in another attempted transaction, the customer is contacted to determine if the card needs to be reissued. If the Social Security Number matches the Social Security Number in the memory of the host computer for the account being used, the operator requests the personal identification number and the counter number that are displayed on the card 10. If the personal identification number and the counter number from the customer matches the personal identification number the counter number of the host computer, the call is authorized and all the numbers previously used are deactivated by the operator. The counter on the card and the counter number in the host computer are now again in sequence.

As depicted in FIG. 6, the customers enters the wrong personal identification number by error. For example, the transactions is the eighth transaction and the personal identification number is 2356, but the customer enters personal identification number 2376. The host computer searches three unused numbers backward and forward in the series. In this case the computer finds 2376 and deactivates it from the series. When the card 10 comes to the personal identification number 2376, the computer requests the customer to press the push button switch 20 and enter the next personal identification number on the card. The call will then be authorized and the personal identification number in the host computer will be deactivated.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A secure credit card including
   a body member including a memory element in which is stored a series of unique numbers in a predetermined sequence,
   said unique numbers being identical to numbers stored in a memory of a host control computer and in the identical sequence as the numbers in the host computer, said host computer being accessible upon each use of the credit card,
   said memory element accessing the next number in sequence with each use of the credit card to permit verification by comparing the number provided by said memory element upon each use of the credit card with the next number in sequence as indicated by the host computer,
   a switch actuated with each use of the credit card to activate the memory element to provide the next number in the sequence,
   a counter which counts each use of the credit card, and
   a display device in the body member connected electrically to the memory element, said display device displaying the next number in the sequence with each use of the credit card.

2. The secure credit card of claim 1 where memory element is an electronically programmable read only element.

3. The secure credit card of claim 2 including a microprocessor controller which is electrically coupled to the electronically programmable read only memory element.

4. The secure credit card of claim 3 where upon actuation of the switch a pulse signal is provided that is forwarded to the microprocessor controller to activate the microprocessor controller to access the electronically programmable read only memory element.

5. The secure credit card of claim 4 where the counter is connected to the microprocessor controller, said counter counting the number of pulse signals received by the microprocessor.

6. The secure credit card of claim 5 where the counter has a display in which a counter number is displayed.

7. Security equipment for verifying credit transactions, including
   a host computer having a memory element in which is stored a plurality of individual account numbers which are authorized to conduct credit transactions,
   each account number having associated therewith a reference series of unique personal identification numbers, the numbers in said reference series being in a predetermined sequence, and only one individual number being used with each credit transaction conducted, said one individual number being from a selected references series that corresponds to the individual account number against which the credit transaction is charged,
   a plurality of remote, portable devices, each one of said remote devices dedicated for use with only one individual account number, each one of said remote devices including a memory element having stored therein a stored series of personal identification numbers identical in number and sequence to the selected reference series,
   each remote device with each use being operable to provide the next number in sequence in said stored series of numbers to permit comparison with the next personal identification number in said selected reference series, said remote devices comprising a secure credit card which includes a body member including a memory element in which is stored a series of unique numbers in a predetermined sequence, said unique numbers being identical to numbers stored in the memory of the host computer and in the identical sequence as the numbers in the host computer, said host computer being accessible upon each use of the credit card, said memory element accessing the next number in sequence with each use of the credit card to permit verification by comparing the account number and the number provided by said memory element upon each use of the credit card with the account number and the next number in sequence as indicated by the host computer, a switch actuated with each use of the credit card to activate the memory element to provide the next number in the sequence, a counter which counts each use of the credit card, and a display device in the body member connected electrically to the memory element, said display device displaying the next number in the sequence with each use of the credit card, and a communication link for establishing communication with the host computer with each individual credit transaction, said communication link transmitting to the host computer the account number and the next in sequence individual personal identification number in the stored series for the remote device used to conduct the credit transaction, said host computer confirming that said transaction is authorized by comparing said account number and said next in sequence personal identification number provided by the remote device with the account number and the next number in sequence in the selected reference series of numbers as indicated by the host computer, said transaction being authorized when both said account number and said personal identification number are identical.

8. The equipment of claim 7 where memory element is an electronically programmable read only element.

9. The equipment of claim 8 including a microprocessor controller which is electrically coupled to the electronically programmable read only memory element.

10. The equipment of claim 9 where upon actuation of the switch a pulse signal is provided that is forwarded to the microprocessor controller to activate the microprocessor controller to access the electronically programmable read only memory element.

11. The equipment of claim 10 where the counter is connected to the microprocessor controller, said counter counting the number of pulse signals received by the microprocessor.

12. The secure credit card of claim 11 where the counter has a display in which a counter number is displayed.

13. The equipment of claim 7 where the remote device is a computer disk.

14. The equipment of claim 7 where the remote device is a radio telephone.

15. A method of verifying that a credit transaction is authorized, including (a) providing a host computer having a memory element in which is stored a plurality of individual account numbers which are authorized to conduct credit transactions, each account number having associated therewith a reference series of unique personal identification numbers, the numbers in said reference series being in a predetermined sequence, and only one individual number being used with each credit transaction conducted, said one individual number being from a selected references series that corresponds to the individual account number against which the credit transaction is charged, (b) providing a plurality of remote, portable devices, each one of said remote devices dedicated for use with only one individual account number, each one of said remote devices including a memory element having stored therein a stored series of personal identification numbers identical in number and sequence to the selected reference series, each remote device with each use being operable to provide the next number in sequence in said stored series of numbers to permit comparison with the next personal identification number in said selected reference series, (c) using a remote device to conduct a credit transaction and transmitting to the host computer the account number and the number in the stored series provided by said remote device, (d) comparing said number provided in step (c) with the next number in sequence in the reference series as indicated by the host computer, (e) not authorizing the transaction if the number generated with the use of the remote device does not match the next number in sequence as indicated by the host computer, and (f) if the transaction is not authorized in step (e), searching forward and backward in the reference Series a predetermined number of said reference Series numbers to determine if said number generated with the use of the remote device is within the scope of the search, and authorizing the transaction if said number generated is within the scope of the search.

16. The method of claim 15 where the remote device is a credit card.

17. The method of claim 15 where the remote device is a computer disk.

18. The method of claim 15 where the remote device is a radio telephone.

19. Equipment for making credit transactions, including a remote, portable transaction device and a host computer adapter to be placed in communication with each other when a credit transaction is to be authorized, said host computer having a memory element in which is stored a plurality of individual account numbers which are authorized to conduct credit transactions, each account number having associated therewith a reference series of unique personal identification numbers, the numbers in said reference series being in a predetermined sequence, and only one individual number being used with each credit transaction conducted, said one individual number being from a selected references series that corresponds to an individual account number against which the credit transaction is charged, said transaction device having a memory element in which is stored a series of unique numbers in a predetermined sequence, said unique numbers being identical to numbers stored in the memory element of the host control computer and in the identical sequence as the numbers in the host computer, said memory element of the transaction device providing the next unique number in sequence with each use of the transaction device to permit verification by comparing the account number and the number provided with each use of the transaction device with the next number in sequence as indicated by the host computer, said host computer confirming that said transaction is authorized by comparing said account number and said next in sequence personal identification number provided by the transaction device with the account number and the next number in sequence in the selected reference series of numbers as indicated by the host computer, said transaction being authorized when both said account number and said personal identification number are identical said remote device comprising a secure credit card which includes
- a body member including said memory element in which is stored said series of unique numbers,
- a switch actuated with each use of the credit card to activate the memory element to provide the next number in the sequence,
- a counter which counts each use of the credit card, and
- a display device in the body member connected electrically to the memory element, said display device displaying the next number in the sequence with each use of the credit card.

* * * * *